April 4, 1950

L. W. WATERS 2,502,906

CLAMPING TYPE DEVICE FOR GAUGING AND ASSORTING ARTICLES

Filed April 23, 1945

INVENTOR.
LAURENCE W. WATERS,
BY
ATTORNEY.

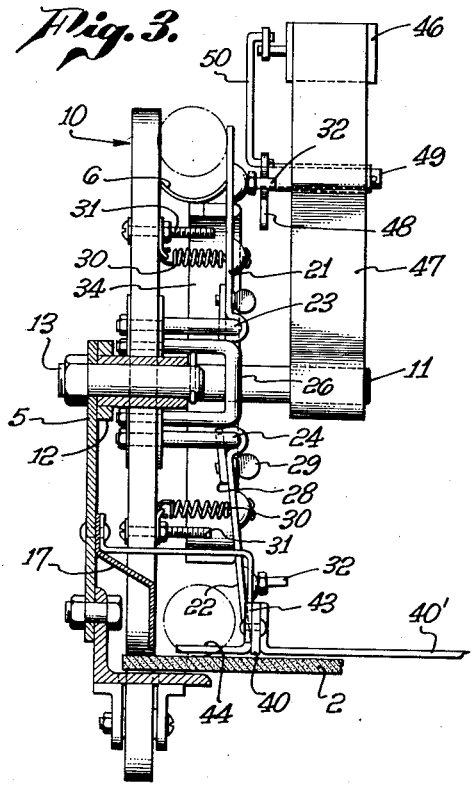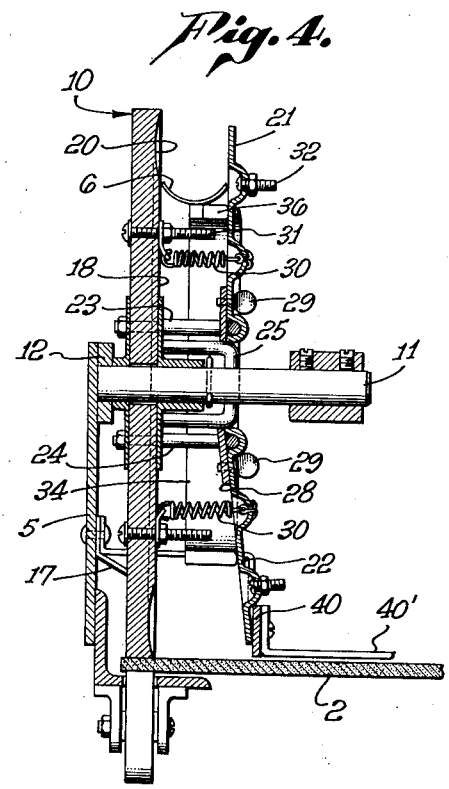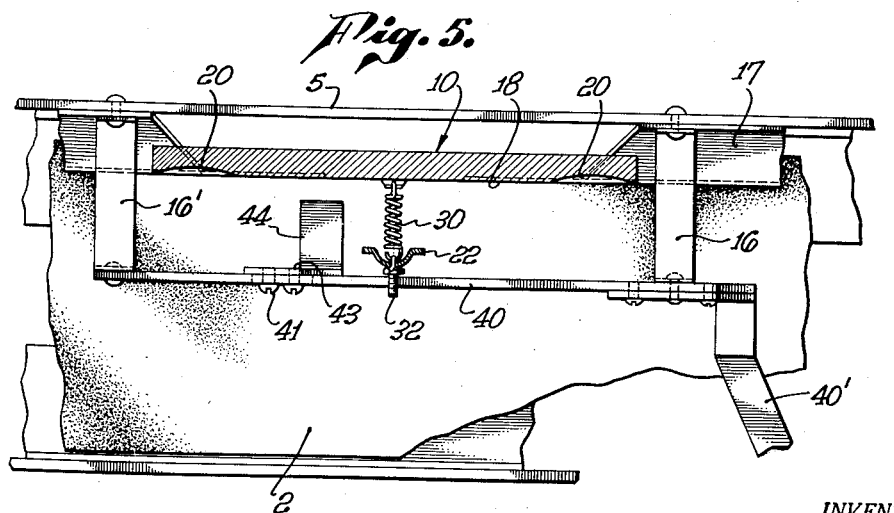

Patented Apr. 4, 1950

2,502,906

UNITED STATES PATENT OFFICE 2,502,906

CLAMPING TYPE DEVICE FOR GAUGING AND ASSORTING ARTICLES

Laurence W. Waters, Ontario, Calif., assignor, by mesne assignments, to Atlas Imperial Diesel Engine Co., Oakland, Calif., a corporation of Delaware Application April 23, 1945, Serial No. 589,885

8 Claims. (Cl. 209—82)

This invention pertains to devices for picking up and feeding objects (preferably spherical, globular, or isotropic) to a receptacle or machine in which the objects are packaged, sorted, examined, pitted, coated, etc. In a specific embodiment, this invention includes devices for use in combination with fruit treating machines such as reamers, pitters and the like. In such embodiment, the invention relates to a device particularly adapted for use in combination with a fruit treating machine and a conveyor by means of which fruit is fed past the machine, the device of the present invention being capable of picking fruit of a size in excess of a predetermined minimum from the belt and feeding it to the machine. Simultaneously, the device may count the fruit so fed to the machine.

In the canning and fruit packing industries the pitting, peeling, reaming or extracting operation is often carried out on machines which need be supplied by operators with individual fruit. Ordinarily these various machines are positioned adjacent a belt conveyor which feeds large quantities of fruit past the machines. The operator must reach to pick up fruit from the conveyor and place the fruit onto the operative parts of the pitting or reaming machine. Since in many instances the operators are paid not on an hourly basis but in terms of number of fruit treated, it is highly desirable that an accurate count be kept of the precise number of fruit treated by each machine and operator. This counting operation is a troublesome one because a machine may be caused to operate whether a fruit is passing therethrough or not, so that very often the counter records the number of working strokes of the fruit treating machine and not the actual number of fruit treated by the machine.

It is an object of the present invention to expedite and facilitate the work of the operator of such machines. This highly desirable objective is attained by providing a receptacle for the fruit to be treated by the operator in a readily accessible position immediately adjacent that portion of the apparatus into which the fruit must be placed by the operator. Time studies have conclusively shown that the efficiency of the operators is greatly reduced whenever it is necessary for them to reach onto the main belt conveyor in order to pick up the fruit.

This reaching is obviated by the provision of means whereby fruit is automatically picked up from the main feeding conveyor and deposited in a receptacle positioned in such relationship to the machine that the operator may pick up the fruit from such receptacle and place it in the machine with the minimum amount of effort.

Another object of the present invention is to disclose and provide means whereby the fruit supplied to the operator by a machine (or to a machine if it is fully automatic in character) is in excess of a predetermined minimum size. It will be readily understood that the main feeding conveyor supplying fruit to a battery of machines may carry fruit which differ in size within very material limits. Occasionally it is highly desirable that a canning machine or machines operate on premium fruit, that is, exceptionally large fruit only, so that the pack from these machines may be separately branded. In other instances it is highly desirable that no machine be fed with fruit below a predetermined minimum size, these so-called runts being utilized in an entirely different packing process. This desirable objective is attained by providing a feeding mechanism which not only feeds fruit to the machine but simultaneously grades the fruit by rejecting all fruit which does not exceed a predetermined minimum size.

Furthermore, in order to make certain that an accurate check be kept of each operator's output, the ultimate form of device contemplated by the present invention includes a counter which is only operated when a fruit is actually fed to the machine.

These and other objects, advantages and adaptations of the invention will become apparent to those skilled in the art from the following detailed description. In order to facilitate understanding, reference will be had to the appended drawings, in which:

Fig. 3 is an end view thereof as seen on line III—III of Fig. 2.

Fig. 4 is a transverse section taken along the plane IV—IV of Fig. 2.

Fig. 5 is a sectional plan view taken along the plane V—V of Fig. 2.

Figure 1:
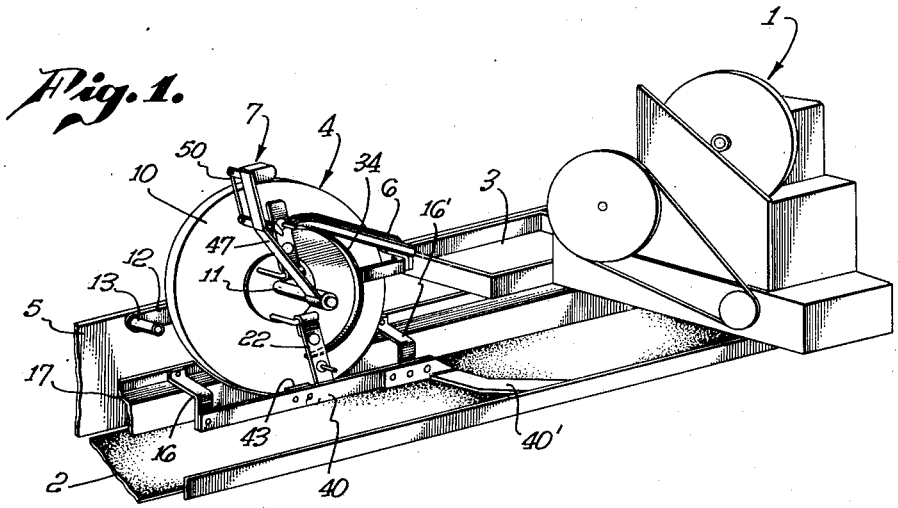
Fig. 1 is a schematic diagram illustrating a form of device in association with correlated elements, in operative position.
Figure 2:
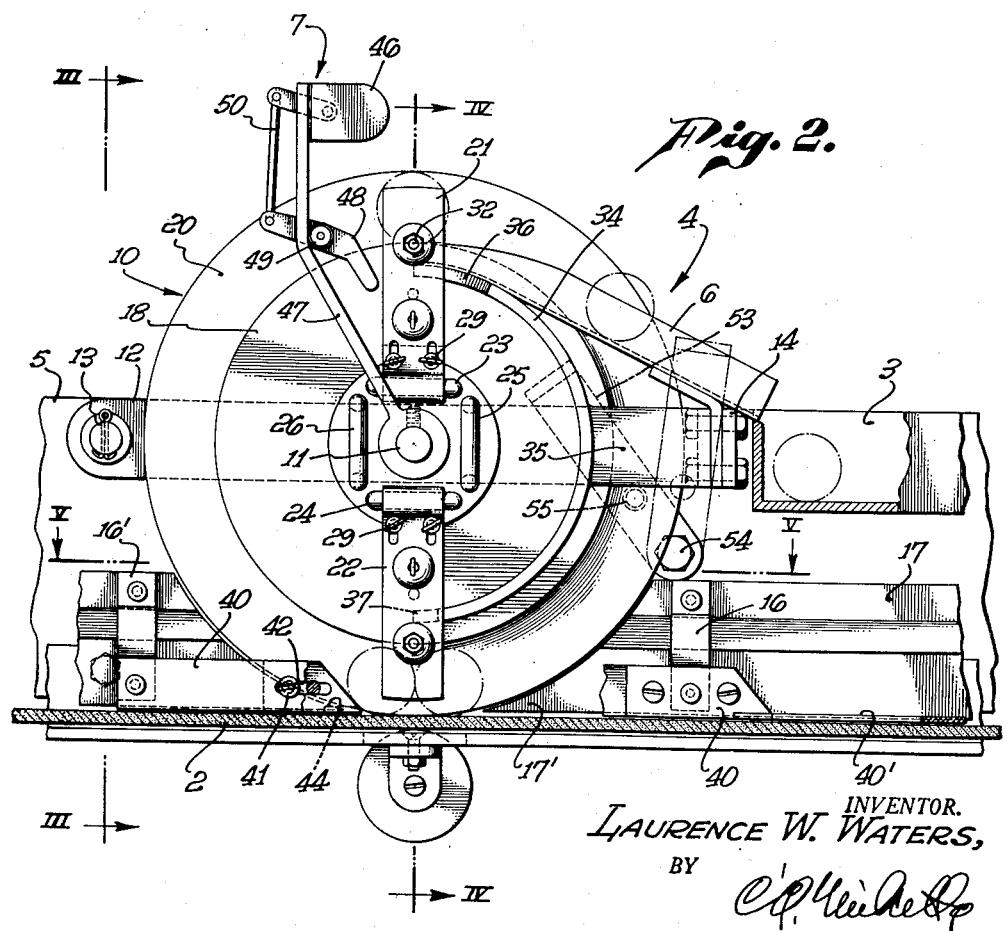
Fig. 2 is a side elevation of an exemplary form of the device.

By referring to the schematic representation in Fig. 1, a fruit treating machine such as a pitter is generically illustrated at 1. This pitter may be one of a number of machines positioned in spaced relation along the travel of a feeding conveyor 2. In a readily accessible position adjacent the pitter 1 is a fruit receptacle 3. The receptacle is so positioned that an operator may easily, with graceful and free movements, move the fruit from the receptacle into the pitter. A feeding device of this invention is generally indicated at 4 and such device is pivotally suspended from the apron 5 of the conveyor 2 and includes a chute 6 extending from the feeder to the receptacle 3. A counter, generally indicated at 7, may be actuated by the feeding device whenever a fruit is fed from the conveyor into the chute. The device 1 may be mounted upon cross braces supported by the apron of the conveyor and a suitable separate conveyor (not shown) may be used for taking away the pitted or reamed fruit. The guide bar 40, provided with a flat extension 40', guides fruit carried by the conveyor 2 into the feeding disc 4. In the embodiment illustrated the operator can stand on the far side of the belt (from the observer). Other arrangements than that schematically illustrated may be used.

An exemplary form of the device is illustrated in greater detail in Figs. 2 to 5 inclusive. In order to simplify the presentation, the fruit treating machine, such as a pitter, is not shown in these drawings.

The feeding device 4 may include a disc 10 journaled upon a stud shaft 11 extending from an arm 12 pivotally connected to the apron 5 as at 13. The entire device is positioned above the conveyor 2 and in the form shown the disc 10 is driven by frictional contact with the upper surface of the belt conveyor 2, the direction of movement of the conveyor being to the left, Fig. 2 and of the disc being clockwise, Fig. 2. The receptacle 3 may be firmly attached to the apron 5 or be made a part of the fruit treating machine.

The arm 12 may be provided with an end portion 14 adapted to support a chute 6 which extends from the upper portion of the feeder to the receptacle 3. Brackets 16 and 16' extend away from the vertical plane of the apron 5. The apron 5 may carry a deflecting guard 17 having a rearwardly extending pointed portion 17' immediately above the belt and in close proximity with the outer surface of the disc 10. The forward portion of this guard 17 may be bent to form a flat impedance bar at an angle to the direction of travel of the belt and extending from a point closely adjacent the apron 5 to the plane of the front face of the disc 10 for the purpose of gently guiding fruit toward the front face of the disc.

Parallel to the face of disc 10 is an upstanding guide bar 40 also held by the brackets 16 and 16' so that a single line of fruit may pass between the disc and bar 40. Adjustably attached to the bar 40 (as by means of screws 41 and slot 42) is bracket 43 provided with a flat, horizontally extending portion 44 which is substantially on the surface of belt 2. This portion 44 is so positioned with respect to taper 37 of cam 34 as to impede the advance of fruit carried by the belt at a point where the arms 21 and 22 move inwardly to grasp the fruit. The flat portion 44 will not cause fruit to pile up and choke the passageway but will momentarily impede and stop a single fruit, pressure by a second fruit against the first one so stopped causing the first to move over the element 44 and be carried away. Such flat impedance bars are particularly effective when the fruit being handled is tender and delicate as is the case with apricots, since the fruit is not bruised or damaged.

The apron 5 together with arm 12, disc 10, bracket 16, etc., may constitute a unit which can be attached to the conveyor assembly or framework in any desired manner. It is to be understood that preferably the disc 10 is so positioned as to be immediately above a roller or firm supporting surface on the lower side of the belt.

The face 18 of the disc 10 may be provided with a slightly concave annular portion 20 capable of forming a slight socket into which the fruit may be pressed by arms 21, 22 and the like. These arms are removably attachable to pivot yokes 23 and 24, additional pivot yokes 25 and 26 being carried by the disc 10 around the central portion of the disc. The arms 21 and 22 may be removably attached to the pivot yokes in any suitable manner as, for example, by means of a clamping bar 28 and thumb screws 29. Moreover, these arms, such as for example the arm 21, are yieldably urged toward the disc face 18 of the disc 10 by means of springs such as spring 30. Motion of the arm toward the disc may be limited, however, by means of an adjustable stop 31 carried by the disc. In the event a counter is to be actuated by the feeding device, each of the arms, such as arm 21, may carry a lug 32. Although the inward movement (toward the disc 10) is limited by the stop 31, means are provided for moving the arms 21, 22 and the like outwardly during a predetermined portion of the travel of such arms. Such outward motion is imparted by means of a semi-circular cam 34 carried by an extension 35 of the bracket 14 and arm 12. The ends of the cam 34 may be tapered as at 36 and 37. The outwardly inclined taper 36 causes the arms to move outwardly (away from the disc) as such arms move toward and above the chute 6. The taper 37 permits the arms to approach the face 18 of the disc 10 at a point immediately above the belt conveyor 2.

When disc 10 is in contact with belt 2 and driven thereby, the articles carried into feeding relation with the disc (between bar 40 and the disc) are picked up and delivered to chute 6. The exact number so delivered may be automatically and positively totalized by a suitable counter 46 carried by a support 47 attached to an extension of stud shaft 11. A trip arm 48 pivoted at 49 may be connected by link 50 to the counter, the end of arm 48 being so positioned with respect to lug 32 as to be tripped thereby whenever the arm 21, holding a fruit, passes the trip arm. Lugs 32 are adjustable as to length and are of such length that the trip arm is not engaged when a fruit is not held by arm 21.

It is to be understood that each arm is adapted to actuate the counter as described. Moreover, the counter may be of any desired type, or it may be eliminated, but in most instances the counter should be used because its relationship to the rest of the device results in greater accuracy and permits a better check upon the production of a pitting, reaming, packing or other machine than that obtained by placing a counter in such position as to be actuated by each cyclic motion of the pitting, reaming or other mechanism.

Whenever it is desired to discontinue the operation of the feeding device, the disc 10 is raised out of contact with the belt. This may be readily done by moving a lever 53 pivotally attached at 54 to apron 5, from the position shown in Fig. 2 to an upright position. The lever 53 carries a roller or lug 55 extending under arm 12 and when the lever is placed in vertical position, the lug 55 raises arm 12 and thereby lifts disc 10 out of contact with the belt. The handle portion of the lever 53 normally rests on top of arm 12 and prevents the lever 53 from dropping.

It will be observed that the device described hereinabove is simple and rugged in construction and may be used in a variety of ways. Its relationship to a fruit-receiving receptacle, such as the receptacle 3, and other machinery may be materially changed from the exemplary arrangement shown in Fig. 1. The disc may be provided with two or more arms adapted to pick fruit or other objects off the belt. Although specific reference has been made to apricots (since apricots present unusual problems), the machine may also be used on plums, peaches, walnuts, citrus fruit, etc.

The specific embodiment illustrated and described is well adapted to the fruit industry which was referred to as an example only. The machine may, of course, be used in handling various objects; tennis balls, golf balls, ball bearings, moulded objects of various types, etc., may be handled by the machine and fed to packaging machines, inspection tables, coating or labeling machines, etc. Those skilled in the art will readily adapt the machine to various uses and objects and all modifications and variations coming within the appended claims are embraced thereby.

I claim:

1. A feeding mechanism adapted to pick up and deliver globular objects from a supply conveyor, comprising: a feeding disc rotatably mounted above a continuous supply conveyor and adapted to be driven by pressure contact therewith, a delivery chute extending from the upper portion of the feeding disc, and movable means carried by the disc for grasping objects on the conveyor and delivering them to the delivery chute.

2. A feeding mechanism adapted to pick up and deliver fruit and the like from a supply conveyor, comprising: a feeding disc rotatably mounted above a continuous supply conveyor and adapted to be driven by pressure contact therewith, a delivery chute extending from the upper portion of the feeding disc, movable means carried by the disc for grasping fruit on the conveyor and delivering them to the delivery chute, and counter means positioned in operable relation to the disc for operation by said movable means while fruit are being delivered to the chute.

3. In an apparatus of the character stated, a circular device positioned above a supply belt, said device being rotatable in a vertical plane and being driven by the belt, a discharge chute extending from a point adjacent the upper portion of the device, movable elements carried by the device to grasp objects from said belt and deliver them to the discharge chute, means for guiding objects past said circular device, and means positioned directly above the supply belt and adjacent the device to restrain a single object in position to be grasped.

4. In a feeding mechanism adapted to pick up and deliver fruit and the like from a supply conveyor, the combination of: an apron support, an arm pivotally connected to the support, a feeder disc mounted on said arm for rotation in a vertical plane by pressure contact with a supply conveyor, a delivery chute carried by the arm and extending from a point adjacent the upper portion of the feeding disc, a plurality of movable arms carried by the disc for grasping fruit on the supply conveyor and delivering them to the chute, and means for moving said arms into and out of fruit grasping position at predetermined points in the cycle of rotation of the disc.

5. In a feeding mechanism adapted to pick up and deliver fruit and the like from a supply conveyor, the combination of: an apron support, an arm pivotally connected to the support, a feeder disc mounted on said arm for rotation in a vertical plane by pressure contact with a supply conveyor, a delivery chute carried by the arm and extending from a point adjacent the upper portion of the feeding disc, a plurality of movable arms carried by the disc for grasping fruit on the supply conveyor and delivering them to the chute, means for moving said arms into and out of fruit grasping position at predetermined points in the cycle of rotation of the disc, and means positioned directly above the supply conveyor and adjacent the feeder disc to restrain a single fruit in position to be grasped.

6. In a feeding mechanism adapted to pick up and deliver fruit and the like from a supply conveyor, the combination of: an apron support, an arm pivotally connected to the support, a feeder disc mounted on said arm for rotation in a vertical plane by pressure contact with a supply conveyor, a delivery chute carried by the arm and extending from a point adjacent the upper portion of the feeding disc, a plurality of movable arms carried by the disc for grasping fruit on the supply conveyor and delivering them to the chute, means for moving said arms into and out of fruit grasping position at predetermined points in the cycle of rotation of the disc, and means for limiting the grasping movement of said arms whereby only fruit of a size in excess of a predetermined minimum are grasped from the supply conveyor.

7. In a feeding mechanism adapted to pick up and deliver objects from a supply conveyor, the combination of: an apron support, an arm pivotally connected to the support, a feeder disc mounted on said arm for rotation in a vertical plane by pressure contact with a supply conveyor, a delivery chute carried by the arm and extending from a point adjacent the upper portion of the feeding disc, a plurality of movable arms carried by the disc for grasping objects on the supply conveyor and delivering them to the chute, means for moving said arms into and out of object-grasping position at predetermined points in the cycle of rotation of the disc, a counter means positioned in operable relation to the disc, and means carried by each of said arms to engage and actuate the counter means when said arms are grasping an object.

8. In an apparatus of the character stated, a circular device positioned above a supply belt, said device being rotatable in a vertical plane and being driven by the belt, a discharge chute extending from a point adjacent the upper portion of the device, movable elements carried by the device to grasp objects from said belt and deliver them to the discharge chute, and means positioned directly above the supply belt and adjacent the device to restrain a single object in position to be grasped.

LAURENCE W. WATERS.

REFERENCES CITED

The following references are of record in the file of this patent:

UNITED STATES PATENTS

| Number | Name | Date |
|---|---|---|
| 1,489,455 | Paranteau | Apr. 8, 1924 |
| 1,923,469 | Yingling | Aug. 22, 1933 |
| 1,977,239 | Molins | Oct. 16, 1934 |
| 2,095,530 | Reiners | Oct. 12, 1937 |